(12) United States Patent
Wu et al.

(10) Patent No.: US 8,930,623 B2
(45) Date of Patent: Jan. 6, 2015

(54) METHOD OF SECURING DATA IN STORAGE DEVICE AND STORAGE DEVICE THEREOF

(75) Inventors: Chien-Liang Wu, Taoyuan County (TW); Kuan-Jen Chen, Yilan County (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 251 days.

(21) Appl. No.: 13/533,946

(22) Filed: Jun. 26, 2012

(65) Prior Publication Data

US 2013/0346691 A1     Dec. 26, 2013

(51) Int. Cl.
  *G06F 12/00*     (2006.01)
(52) U.S. Cl.
  USPC ................... 711/115; 711/E12.001
(58) Field of Classification Search
  USPC .......................... 711/115, E12.001
  See application file for complete search history.

(56) References Cited

U.S. PATENT DOCUMENTS

| 2008/0083037 A1* | 4/2008 | Kruse et al. ..................... 726/27 |
| 2011/0087826 A1* | 4/2011 | Lin et al. ....................... 711/103 |
| 2012/0096246 A1* | 4/2012 | Pio ................................. 712/233 |
| 2013/0211664 A1* | 8/2013 | Faivre et al. .................. 701/33.3 |

FOREIGN PATENT DOCUMENTS

EP        1359758 A1    11/2003

* cited by examiner

*Primary Examiner* — Yong Choe
(74) *Attorney, Agent, or Firm* — Winston Hsu; Scott Margo

(57) ABSTRACT

After a file is stored in a storage device, the file is segmented into a first segment and a second segment, the latter of which is relocated to a removable security device only when the removable security device is connected to the storage device. After the removable security device is removed from the storage device, as long as the removable security device is kept by the owner of the file, the file cannot be accessible for someone other than the owner even if said someone takes the storage device. Security of the file is thus assured.

16 Claims, 9 Drawing Sheets

METHOD OF SECURING DATA IN STORAGE DEVICE AND STORAGE DEVICE THEREOF

BACKGROUND

1. Technical Field

The present invention relates to a method of securing data in a storage device and a storage device thereof, and more particularly, to a method of securing data in a storage device by keeping part of stored data in a removable security device and a storage device thereof.

2. Description of the Conventional Art

For transferring and carrying data in a convenient manner, flash drives are designed for meeting such requirements. Private information may also be stored in a flash drive for being accessed anytime when the owner of the private information needs.

However, if a flash drive is not securely kept, the private information will be easily and maliciously accessed or even tampered by anyone who takes the flash drive. Therefore, protection for information stored in a flash drive is highly required.

SUMMARY

An embodiment of the claimed invention discloses a method of securing data in a storage device. The method comprises steps of (a) confirming whether there is a removable security device connected to the storage device when there is an attempt of storing a file into the storage device; (b) segmenting the file into a first segment and a second segment when the removable security device is confirmed being connected to the storage device; (c) storing the first segment into the storage device and the second segment into the removable security device; and (d) removing the removable security device from the storage device.

Another embodiment of the claimed invention discloses a method of securing data in a storage device. The method comprises steps of (a) segmenting a file into a first segment and a second segment, and storing both the first segment and the second segment into the storage device when there is an attempt of storing the file into the storage device; (b) confirming whether there is a removable security device connected to the storage device after step (a); (c) relocating the second segment from the storage device into the removable security device when the removable security device is confirmed being connected to the storage device; and (d) removing the removable security device from the storage device.

Another embodiment of the claimed invention discloses a storage device. The storage device comprises a first bus, a second bus, a memory, and a controller. The first bus is configured to be connected to a host device. The second bus is configured to be connected to a removable security device. The controller is coupled to the first bus, the second bus, and the memory. The controller is configured to receive a file from the host device via the first bus, to confirm whether the removable security device is connected to the second bus, to segment the file into a first segment and a second segment, and to store the first segment into the memory and the second segment into the removable security device when the removable security device is confirmed, by the controller, being connected to the second bus.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a method of securing data in a storage device and the storage device. The primary idea of the present invention is to segment a file, which may be transferred from a host to the storage device of the present invention, into at least two segments, and may transfer one part of the at least two segments to a removable security device when the removable security device is connected to the storage device.

In embodiments of the present invention, the host may be but not limited to a computer, a tablet computer, a laptop, a mobile electronic device, etc.; the removable security device may be but not limited to a flash drive, a memory card, etc., as long as the removable security device is capable of storing electronic data.

Therefore, anyone other than the owner of the file cannot access said file if he or she only has the storage device but does not have the removable security device, since the file cannot be recovered and accessed without anyone of the at least two segments.

Figure 1:
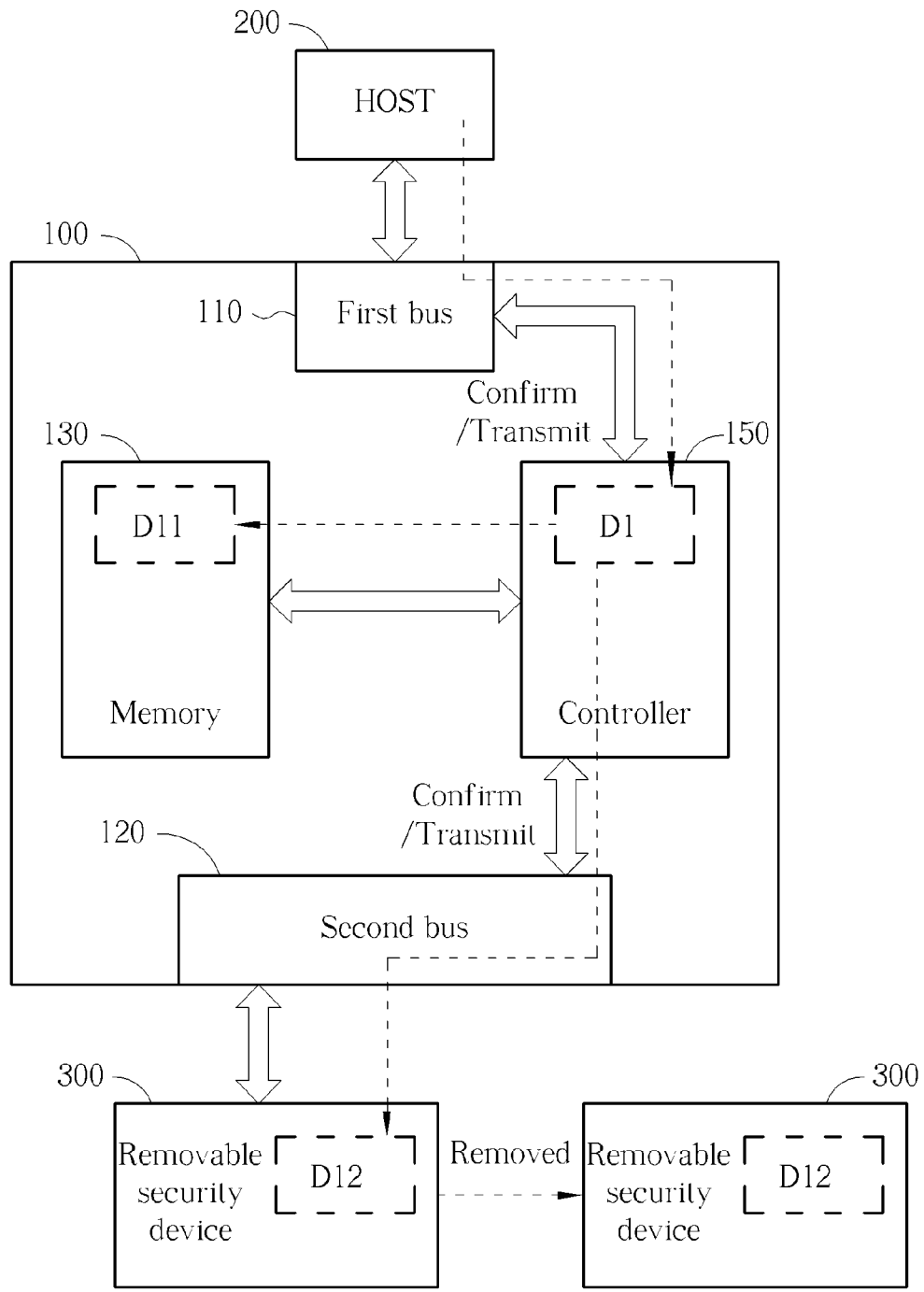
FIGS. 1-5 disclose how to secure a file stored in a storage device by relocating a segment of the file to a removable security device, according to embodiments of the present invention.

Please refer to FIG. 1 which illustrates how a storage device 100 of the present invention works for securing a file D1 according to one embodiment of the present invention. As shown in FIG. 1, the storage device 100 includes a controller 150, a first bus 110, a second bus 120 and a memory 130. In embodiments of the present invention, the first bus 110 and the second bus 120 are capable of connecting with an external device in a wired and/or wireless manner; therefore, the connections or couplings related to the first bus 110 and the second bus 120 may be wired connections or wireless connections in the following descriptions.

The controller 150 is coupled to the first bus 100, the second bus 120 and the memory 130. A host 200 may be connected to the storage device 100 via the first bus 110, and may issue a request to the storage device 100 for storing the file D1 in the storage device 100, where the controller 150 can be utilized for confirming whether the host 200 is connected to the storage device 100 via the first bus 110.

How the storage device 100 is utilized for securing the file D1 is described as the following. The controller 150 detects via the second bus 120 to confirm whether a removable security device is connected to the second bus 120 when the controller 150 receives the request of storing the file D1 from the host 200. When the controller 150 confirms that a removable security device 300 has been connected to the storage device 100 via the second bus 120, the controller 150 segments the file D1 into a first segment D11 and a second segment D12, stores the first segment D11 in the memory 130, and stores the second segment D12 in the removable security device 300. After the removable security device 300 is removed from the second bus 120, the security of the file D1 is completed.

In aspects of security, if the storage device 100 is unfortunately stolen by someone other than the owner of the storage device 100, when the thief uses another host, or even the host 200, to browse the storage device 100, the first segment D11 is unreadable unless being combined with the second segment D12 to recover the original file D1, as long as the thief does not have the removable security device 300 and has it connected to the storage device 100. Therefore, the file D1 will be kept unreadable and inaccessible to the thief, and the security of the file D1 is thereby assured. Note that the controller 150 is configured to confirm whether the removable security device 300 is connected to the storage device 100 when a host is connected to the storage device 100 and intends to browse the storage device 100.

Figure 2:
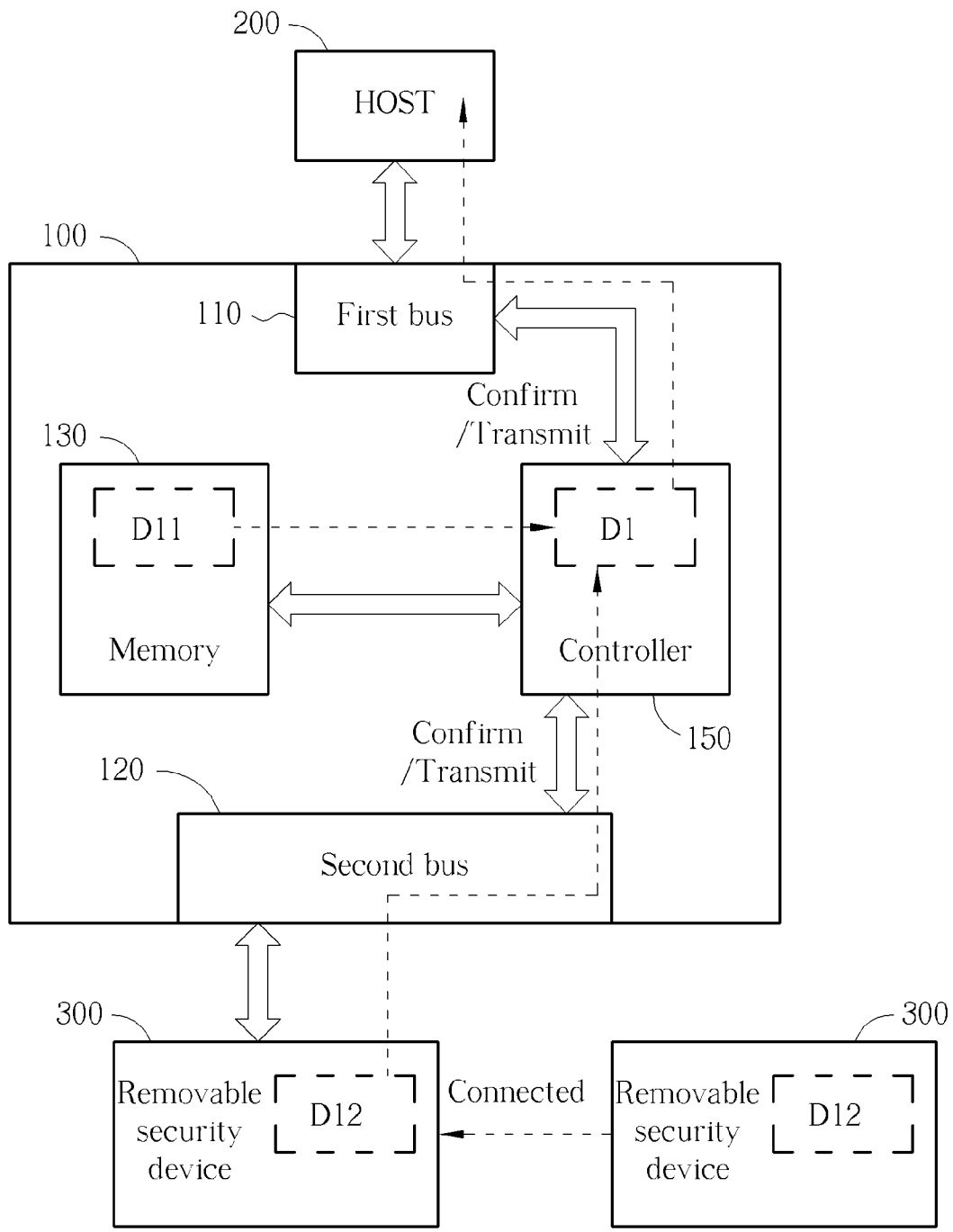

Please refer to FIG. 2 which illustrates how the file D1 is restored after the segmentation shown in FIG. 1. As shown in FIG. 2, when the owner of the storage device 100 intends to access the file D1, said owner may have the host 200 (or another host) connected to the storage device 100 via the first bus 110 for browsing the storage device 100, and may have the removable security device 300 connected to the storage device 100 via the second bus 120.

The controller 150 confirms whether the removable security device 300 carrying the second segment D12 is connected to the storage device 100 after the host 200 issues a request of browsing the storage device 100. After the controller 150 confirms that the removable security device 300 has been connected to the storage device 100, the controller 150 loads the second segment D12 from the removable security device 300 and combines the first segment D11, which is directly loaded from the memory 130, with the second segment D12 to restore the file D1. At last, the controller 150 allows the request of the host 200 for accessing the restored file D1.

As can be observed from FIG. 2, the file D1 can only be restored when the removable security device 300 carrying the second segment D12 is connected to the storage device 100 carrying the first D11. Therefore, under the assumption that the thief cannot take the removable security device 300 carrying the second segment D12, the file D1 will only be readable and accessible for the owner of the file D1 as long as the owner keeps the removable security device 300.

Figure 3:
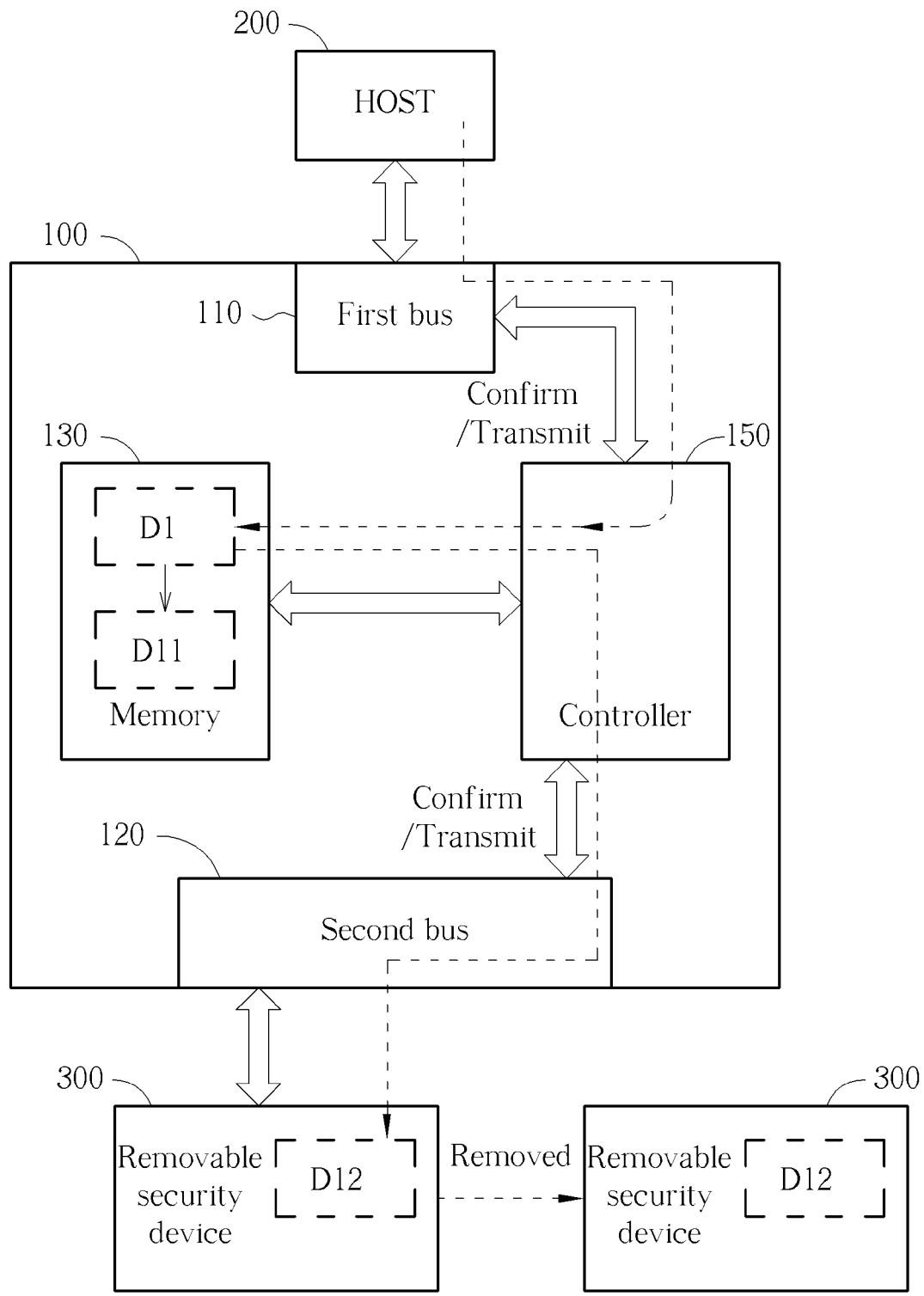

As shown in FIG. 3, in one embodiment of the present invention, when the host 200 issues the request of storing the file D1 in the storage device 100 but the controller 150 confirms that no removable security device has been connected to the storage device 100 yet, the file D1 is temporarily stored in the memory 130 in advance, until the removable security device 300 is confirmed, by the controller 150, being connected to the storage device 100. After the removable security device 300 is confirmed to be connected to the storage device 100 later, the controller 150 segments the file D1 into the first segment D11 and the second segment D12, stores the first segment D11 in the memory 130, and relocates the second segment D12 to the removable security device 300. The security of the file D1 is also assured after the removable security device 300 is removed from the storage device 100.

Additionally, the controller 150 may render the second segment D12 a constant size smaller than an available storage volume of the removable security device 300, e.g. 10 Kbyte in one embodiment. In another embodiment, the controller 150 may determine a size ratio of the second segment D12 to the first segment D11 and render the second segment D12 a size according to the size ratio. For one example, the size ratio may be predetermined as 1:1000 of the first segment D11 to the second segment D12. For another example, after the removable security device 300 is connected with the storage device 100, the size ratio may be calculated according to an available storage volume of the removable security device 300 to that of the storage device 100 for preventing from running out of storage of the removable security device 300.

In one embodiment of the present invention, besides keeping the second segment D12 in the removable security device 300, a copy of the second segment D12 may be optionally kept in the host 200 for ensuring that the file D1 can be recovered under unexpected loss of the removable security device 300. Please refer to FIG. 4 and FIG. 5, which illustrate how to keep a copy of the second segment D12 and how to restore the file D1, respectively, in case the removable security device 300 shown in FIG. 2 is lost.

Figure 4:
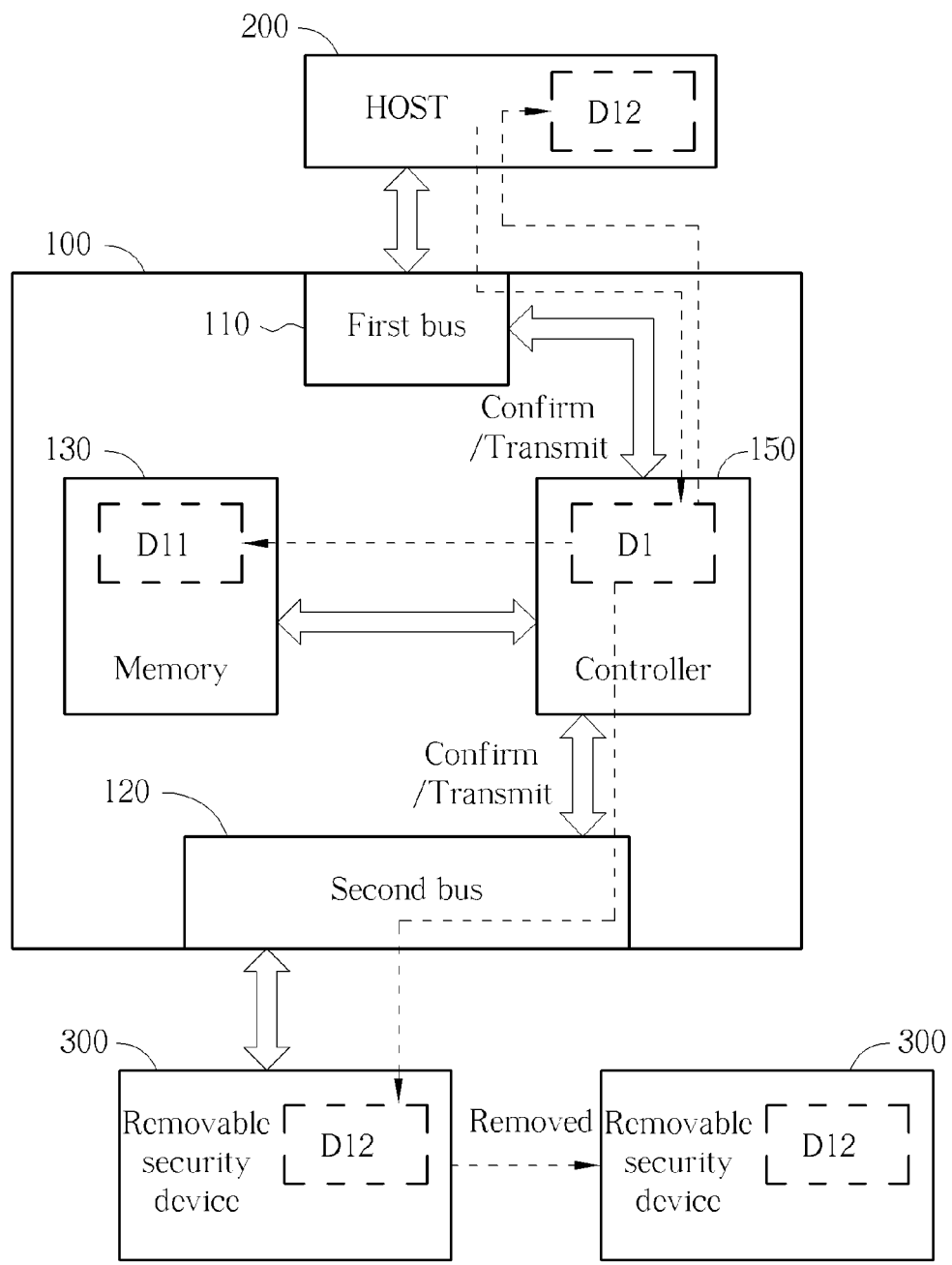
Figure 5:
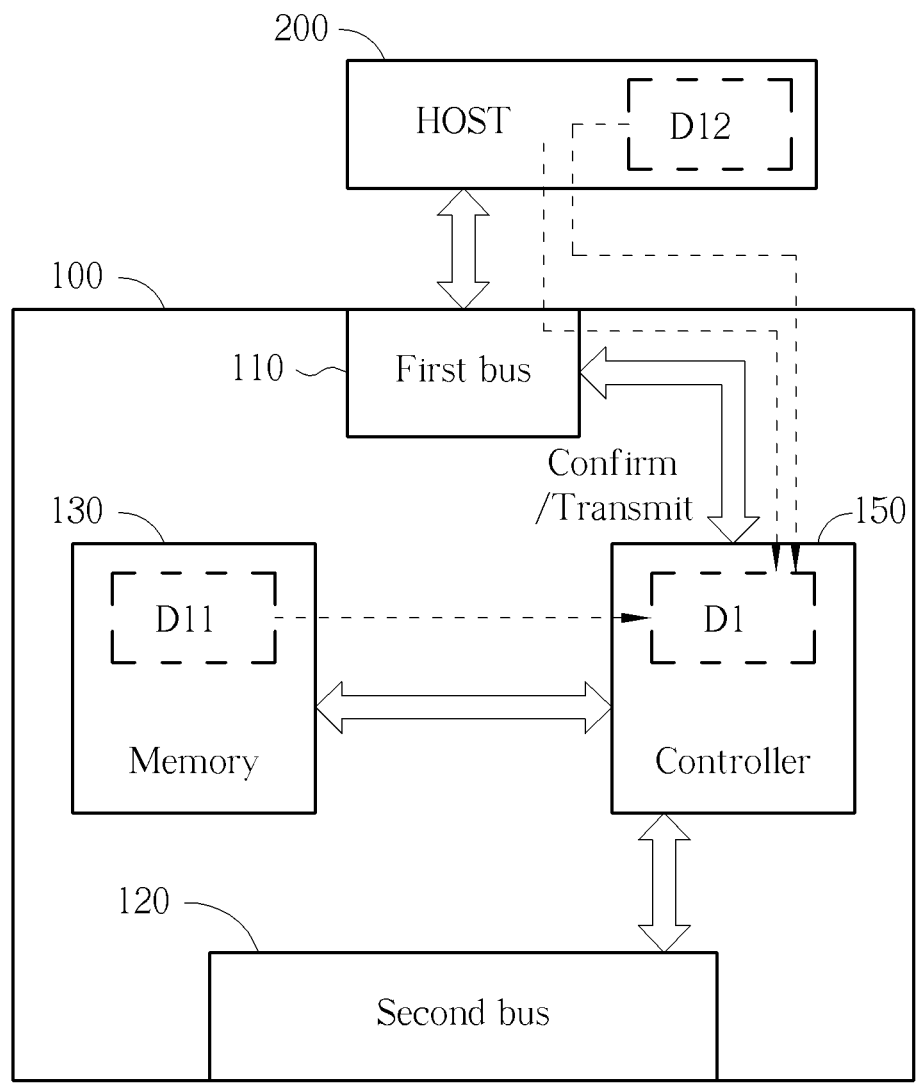

As shown in FIG. 4, when the second segment D12 is generated by segmenting the file D1 and then relocated to the removable security device 300, a copy of the second segment D12 is further generated by the controller 150 and is stored into the host 200. Therefore, as shown in FIG. 5, without the removable security device 300, the copy of the second segment D12 can be loaded by the controller 150 from the host 200 and be combined with the first segment D11 loaded from the memory 130 to restore the file D1. As mentioned before, the controller 150 may then allow the request of accessing the restored file D1 from the host 200.

Note that the additional copy into the host 200 of the second segment D12 can be optionally activated by the user of the storage device 100, especially when the host 200 is only accessible for the user of the storage device 100 as well. Therefore, besides the security of the file D1, the completeness of the file D1 can also be assured in case that the removable security device 300 is lost.

In the above embodiments of the present invention, the second segment D12 is relocated to the removable security device 300 right after the second segment D12 is generated, i.e., for securing the file D1, the second segment D12 is not allowed to stay at the memory 130. However, in some embodiments of the present invention, the second segment D12 is optionally allowed to stay at the memory 130 before the removable security device 300 is confirmed, by the controller 150, to be connected to the storage device 100.

Figure 6:
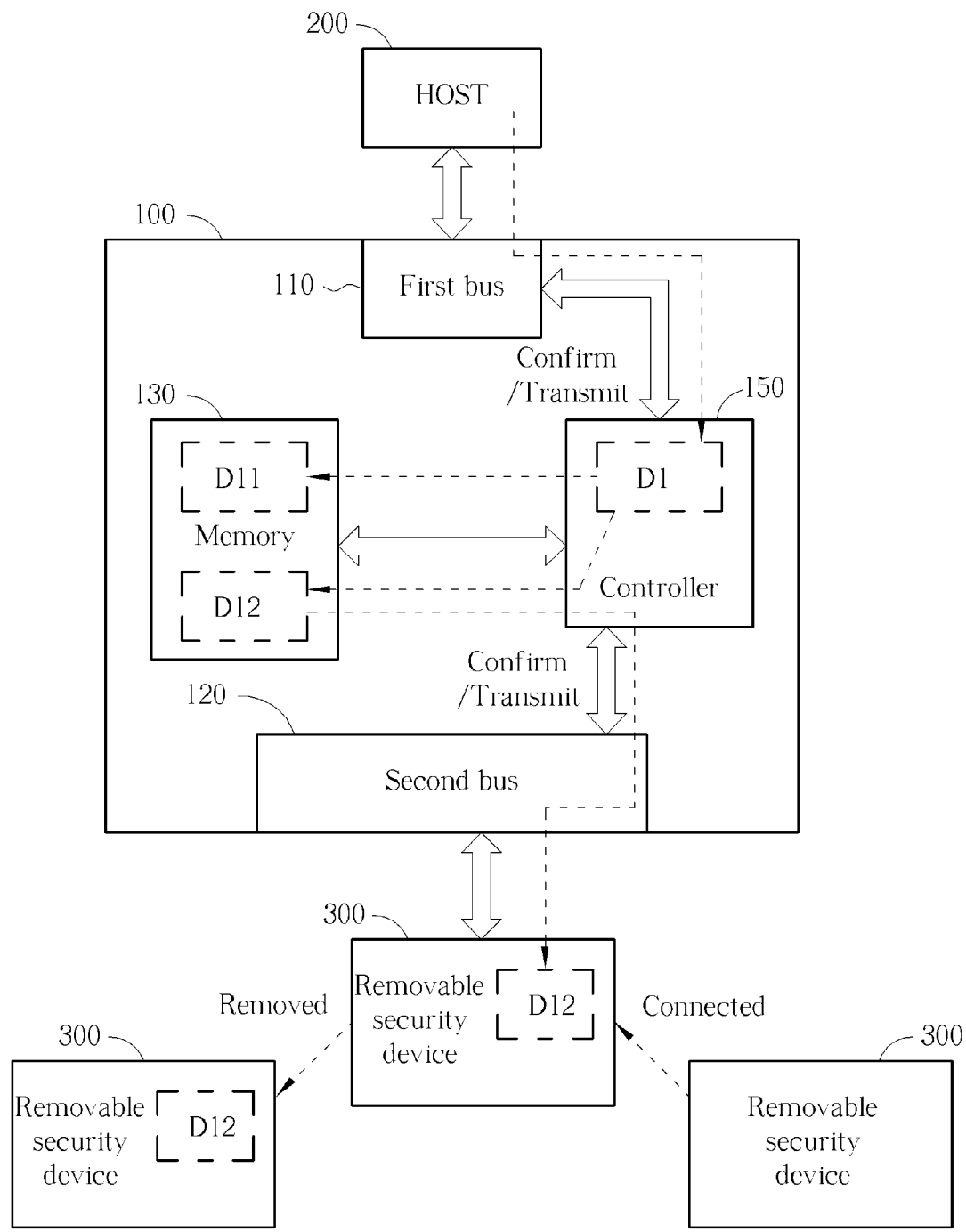
FIGS. 6-7 disclose how to secure a file stored in a storage device by temporarily storing a segment in the storage device before relocating the segment of the file to a removable security device, according to embodiments of the present invention.

Please refer to FIG. 6 which illustrates temporarily keeping the second segment D12 at the memory 130 before the controller 150 confirms that the removable security device 300 is connected to the storage device 100, according to one embodiment of the present invention. In FIG. 6, when the host 200 issues a request to the storage device 100 for storing the file D1 in the storage device 100, and when the controller 150 confirms that no removable security device has been connected to the storage device 100 yet, the controller 150 receives the file D1, segments the file D1 into the first segment D11 and the second segment D12, and stores both the first segment D11 and the second segment D12 at the memory 130 in advance. If the removable security device 300 is then confirmed by the controller 150 to be connected to the storage device 100 later, the controller 150 relocates the second segment D12 to the removable security device 300. Security of the file D1 is thus fulfilled. The procedure of restoring the file D1 after the host 200 and the removable security device 300 are connected to the storage device 100 is similar to the restoring procedure discussed in FIG. 2, so that the procedure of restoring the file D1 shown in FIG. 6 is not repeatedly described for brevity.

The rendered size of the second segment D12 may refer to the foregoing descriptions. Additionally, there is another example of rendering the second segment D12 a size in the embodiment of FIG. 6. Initially, the controller 150 may render the second segment D12 a size during execution of the segmentation. After the removable security device 300 is connected with the storage device 100, an available storage volume of the removable security device 300 is detected. If the size of the second segment D12 is larger than the available storage volume, modifying the size to be smaller than the available storage volume by moving part of the second segment D12 back to the storage device 100 to combine with the first segment D11.

Figure 7:
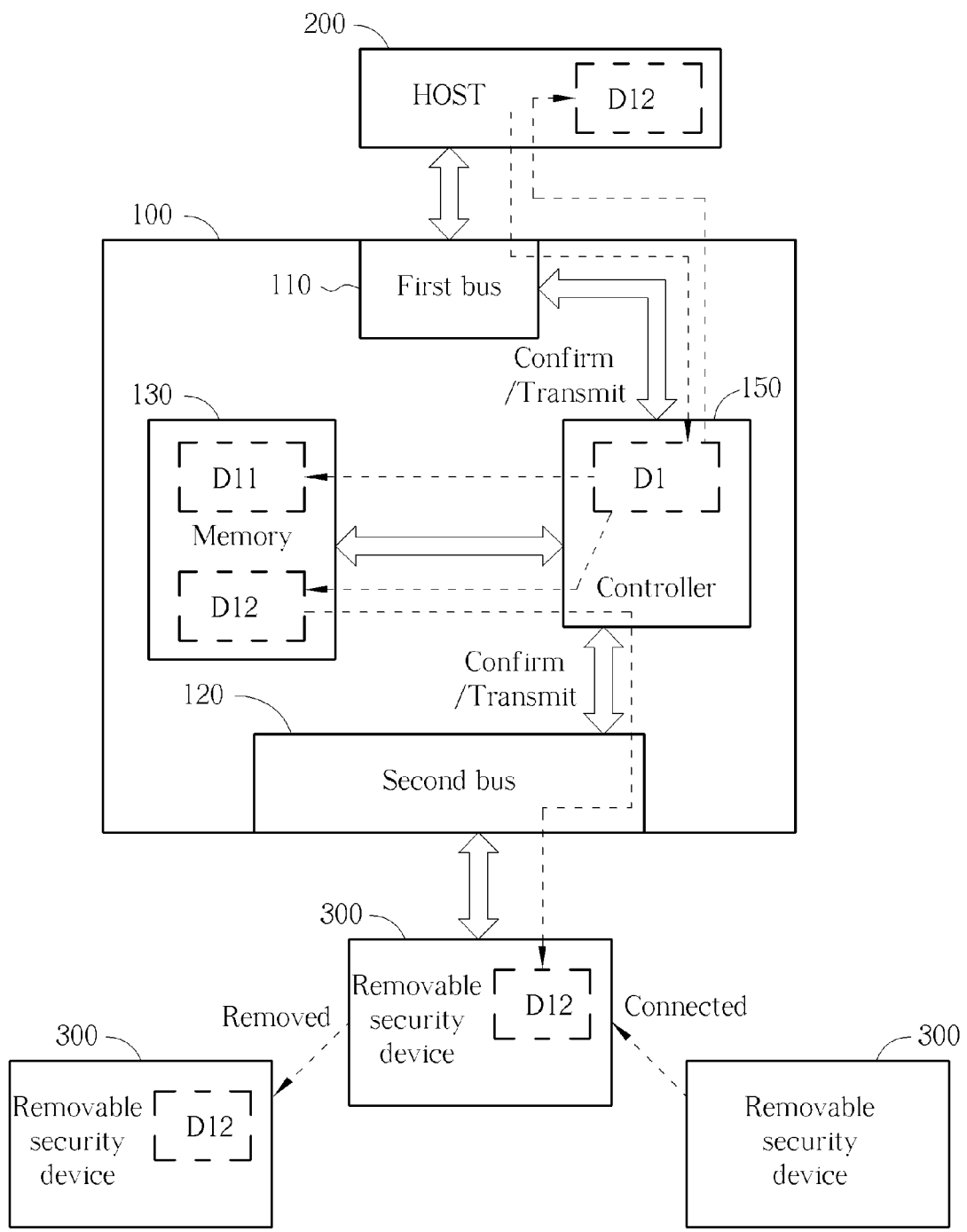

Under the case that the second segment D12 is temporarily stored in the memory 130, similar to the case shown in FIG. 4 and FIG. 5, a copy of the second segment D12 may also be stored in the host 200, according to one embodiment of the present invention and as shown in FIG. 7. The procedure of restoring the file D1 is similar to the procedure shown in FIG. 5 so that how to restore the file D1 shown in FIG. 7 is not repeatedly described for brevity.

In some embodiments of the present invention, hosts other than the host 200, which previously carries the file D1 and stores the file D1 in the storage device 100, may also be utilized for replacing the host 200 shown in FIG. 2 for restoring the file D1, as long as the removable security device 300 carrying the second segment D12 is confirmed by the controller 150 to be connected to the storage device 100.

In embodiments of the present invention, the file D1 may be segmented into more than two segments, some of which are processed as how the first segment D11 is processed and the remainder are processed as how the second segment D12 is processed.

Figure 8:
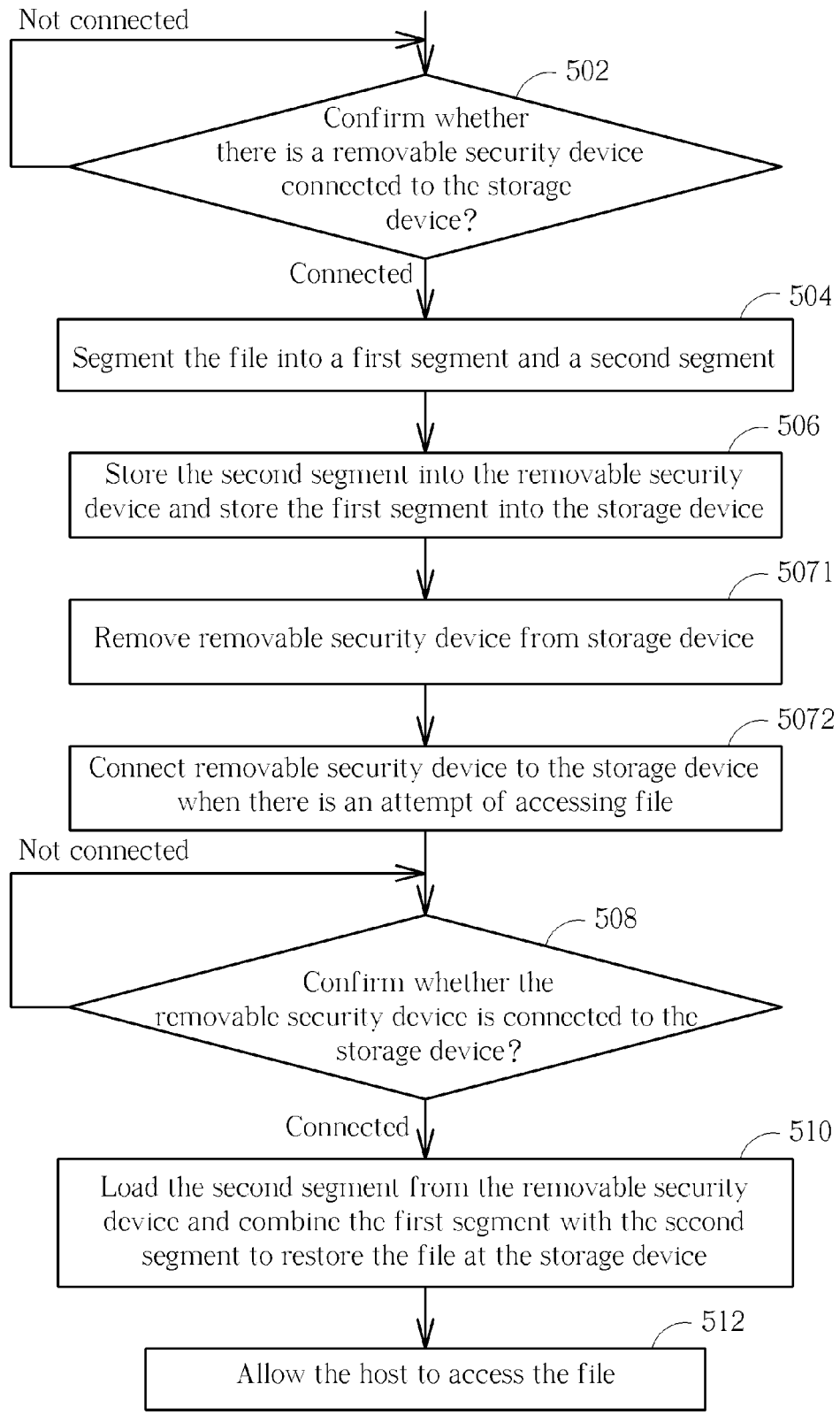
FIGS. 8-9 illustrate flowcharts of methods of securing data in a storage device according to embodiments of the present invention.

Please refer to FIG. 8 which illustrates a flowchart of the method of securing data in a storage device for not keeping the second segment D12 in the memory 130, according to a first embodiment of the present invention described previously. As shown in FIG. 8, the method includes steps as the following:

Step 502: Confirm whether there is a removable security device connected to the storage device when there is an attempt of storing a file into the storage device from a host connected to the storage device; when a removable security device is confirmed being connected to the storage device, go to Step 504, else, go to Step 502.

Step 504: Segment the file into a first segment and a second segment.

Step 506: Store the second segment into the removable security device and store the first segment into the storage device.

Step 5071: Remove the removable security device from the storage device.

Step 5072: Connect the removable security device to the storage device when there is an attempt of accessing the file.

Step 508: Confirm whether the removable security device is connected to the storage device when there is an attempt of accessing the file from the host and when the host is currently connected to the storage device; when the removable security device is confirmed being connected to the storage device, go to Step 510, else, go to Step 508.

Step 510: Load the second segment from the removable security device and combine the first segment with the second segment to restore the file at the storage device.

Step 512: Allow the host to access the file.

Step 502, Step 504 and Step 506 relate to how to segment the file into the first segment and the second segment. Step 508, Step 510 and Step 512 relate to how to combine the first segment and the second segment to restore the file.

Figure 9:
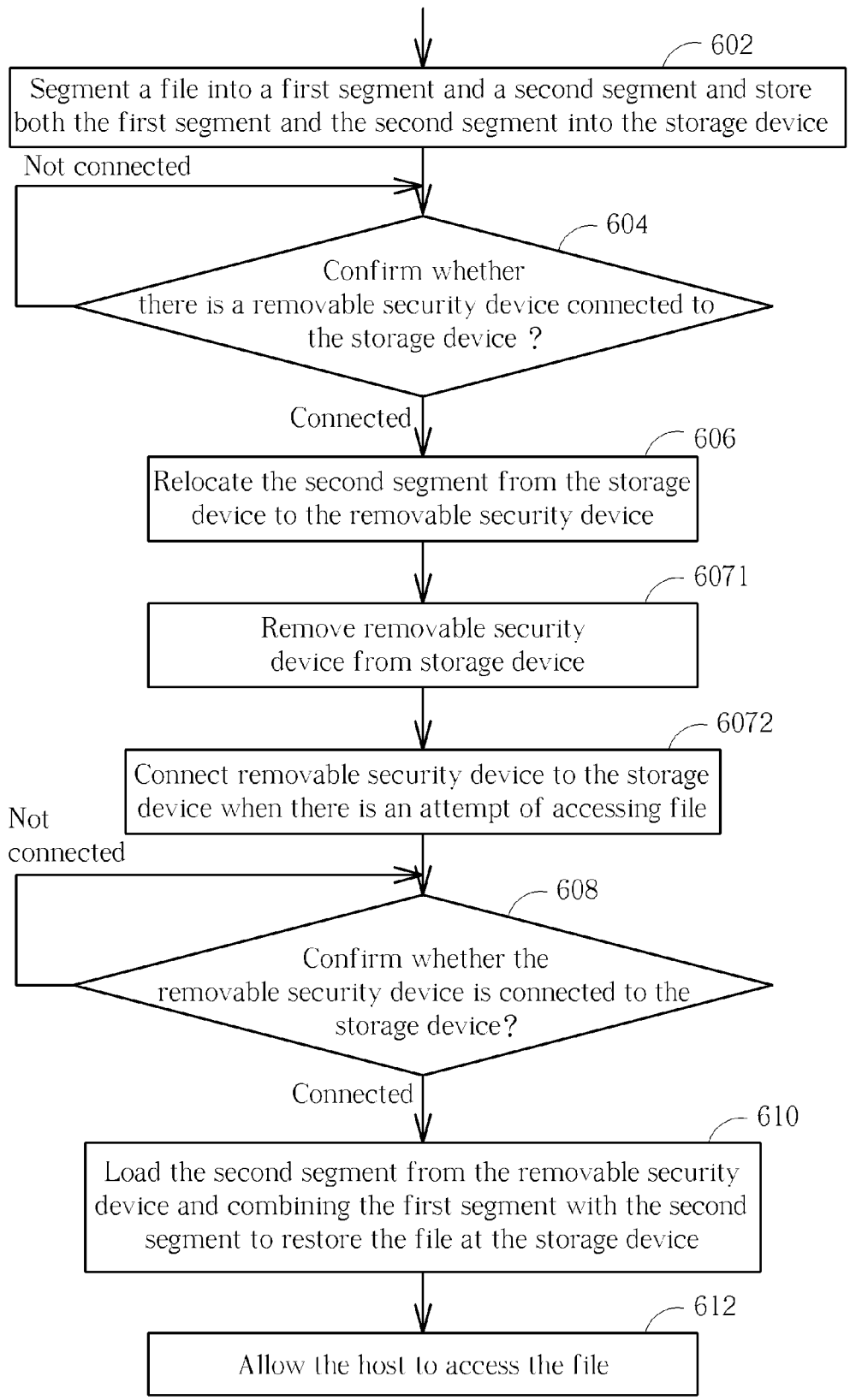

Please refer to FIG. 9 which illustrates a flowchart of the method of securing data in a storage device for keeping the second segment D12 in the memory before the removable security device is confirmed to be connected to the storage device, according to a second embodiment of the present invention described previously. As shown in FIG. 9, the method includes steps as the following:

Step 602: Segment a file into a first segment and a second segment and store both the first segment and the second segment into the storage device when there is an attempt of storing the file into the storage device from a host and when the host is currently connected to the storage device.

Step 604: Confirm whether there is a removable security device connected to the storage device; when a removable security device is confirmed being connected to the storage device, go to Step 606, else, go to Step 604.

Step 606: Relocate the second segment from the storage device to the removable security device.

Step 6071: Remove the removable security device from the storage device.

Step 6072: Connect the removable security device to the storage device when there is an attempt of accessing the file.

Step 608: Confirm whether the removable security device is connected to the storage device when there is an attempt of accessing the file from the host and when the host is currently connected to the storage device; when the removable security device is confirmed being connected to the storage device, go to Step 610, else, go to Step 608.

Step 610: Load the second segment from the removable security device and combine the first segment with the second segment to restore the file at the storage device.

Step 612: Allow the host to access the file in response to the attempt of accessing the file.

Step 602, Step 604 and Step 606 relate to how to segment the file into the first segment and the second segment. Step 608, Step 610 and Step 612 relate to how to combine the first segment and the second segment to restore the file.

Embodiments formed by reasonable combinations or permutations of the steps shown in FIG. 8 or FIG. 9 or formed by adding the abovementioned limitations to the steps shown in FIG. 8 or FIG. 9 should also be regarded as embodiments of the present invention.

The present invention discloses a method of securing data in a storage device and the storage device, for preventing an original file stored in the storage device from being accessed by anyone who does not own the removable security device storing part of the original file.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of securing data in a storage device, comprising:
(a) confirming whether there is a removable security device connected to the storage device when a host attempts to store a file into the storage device;
(b) segmenting the file into a first segment and a second segment, determining a size ratio of the second segment to the first segment, and rendering the second segment a size according to the size ratio when the removable security device is confirmed being connected to the storage device;

(c) storing the first segment into the storage device and relocating the second segment from the storage device into the removable security device; and (d) removing the removable security device from the storage device.

2. The method of claim 1, further comprising:

(e) connecting the removable security device to the storage device when the host attempts to access the file;

(f) loading the second segment from the removable security device; and (g) combining the second segment with the first segment to restore the file.

3. The method of claim 1, wherein the size ratio is calculated according to an available storage volume of the removable security device to that of the storage device.

4. The method of claim 1, further comprising:

(h) directly storing the file into the storage device when the removable security device is confirmed not being connected to the storage device.

5. A method of securing data in a storage device, comprising:

(a) segmenting a file into a first segment and a second segment, determining a size ratio of the second segment to the first segment, rendering the second segment a size according to the size ratio, and storing both the first segment and the second segment into the storage device when-a host attempts to store the file into the storage device;

(b) confirming whether there is a removable security device connected to the storage device after step (a);

(c) relocating the second segment from the storage device into the removable security device when the removable security device is confirmed being connected to the storage device; and (d) removing the removable security device from the storage device.

6. The method of claim 5, further comprising:

(e) connecting the removable security device to the storage device when the host attempts to access the file;

(f) loading the second segment from the removable security device; and (g) combining the second segment with the first segment to restore the file.

7. The method of claim 5, wherein the size ratio is calculated according to an available storage volume of the removable security device to that of the storage device.

8. The method of claim 5, further comprising:

(h) detecting an available storage volume of the removable security device; and (i) if the size is larger than the available storage volume, modifying the size to be smaller than the available storage volume by moving part of the second segment back to combine with the first segment.

9. A storage device, comprising:
a first bus configured to be connected to a host device;
a second bus configured to be connected to a removable security device;
a memory; and
a controller coupled to the first bus, the second bus, and the memory, the controller being configured to receive a file from the host device via the first bus, to confirm whether the removable security device is connected to the second bus, to segment the file into a first segment and a second segment, to determine a size ratio of the second segment to the first segment, to render the second segment a size according to the size ratio, and to store the first segment into the memory and to relocate the second segment through the storage device into the removable security device when the removable security device is confirmed, by the controller, being connected to the second bus.

10. The storage device of claim 9, wherein when the host device attempts to store the file into the storage device, the controller is configured to segment the file into the first segment and the second segment when the removable security device is confirmed being connected to the second bus.

11. The storage device of claim 10, wherein when the host device attempts to access the file, the controller is further to load the second segment from the removable security device and combine the second segment with the first segment to restore the file when the removable security device is confirmed being connected to the second bus.

12. The storage device of claim 9, wherein the size ratio is calculated according to an available storage volume of the removable security device to that of the storage device.

13. The storage device of claim 9, wherein the controller is further configured to segment the file into the first segment and the second segment and to store both the first segment and the second segment into the memory when the file has been received by the storage device from the host device, and then to relocate the second segment from the memory to the removable security device when the removable security device is confirmed being connected to the second bus.

14. The storage device of claim 13, wherein when the host device attempts to access the file, the controller is further to load the second segment from the removable security device and combine the second segment with the first segment to restore the file when the removable security device is confirmed being connected to the second bus.

15. The storage device of claim 13, wherein the size ratio is calculated according to an available storage volume of the removable security device to that of the storage device.

16. The storage device of claim 13, wherein the controller is further configured to detect an available storage volume of the removable security device, and to modify the size to be smaller than the available storage volume by moving part of the second segment back to combine with the first segment if the size is larger than the available storage volume.

* * * * *